United States Patent
Prinz et al.

(10) Patent No.: US 7,638,734 B2
(45) Date of Patent: Dec. 29, 2009

(54) METHOD AND CIRCUIT FOR CONTACTLESS IGNITION OF A WELDING ARC WITH HIGH FREQUENCY IGNITION PULSE PACKETS

(75) Inventors: Andreas Prinz, Neuhofen (AT); Walter Pammer, Bad Hall (AT); Gerald Hieslmair, Piberbach (AT); Uwe Kroiss, Wilhering (AT)

(73) Assignee: Fronius International GmbH, Pettenbach (AT)

( * ) Notice: Subject to any disclaimer, the term of this patent is extended or adjusted under 35 U.S.C. 154(b) by 211 days.

(21) Appl. No.: 10/578,970

(22) PCT Filed: Nov. 10, 2004

(86) PCT No.: PCT/AT2004/000394

§ 371 (c)(1),
(2), (4) Date: Jan. 5, 2007

(87) PCT Pub. No.: WO2005/051585

PCT Pub. Date: Jun. 9, 2005

(65) Prior Publication Data

US 2007/0102405 A1    May 10, 2007

(30) Foreign Application Priority Data

Nov. 25, 2003    (AT)    ............... A 1889/2003

(51) Int. Cl.
    *B23K 9/067* (2006.01)
(52) U.S. Cl. ............... 219/130.4; 219/130.51; 219/121.57
(58) Field of Classification Search ............ 219/130.4, 219/130.51, 121.54, 121.57, 121.45
    See application file for complete search history.

(56) References Cited

U.S. PATENT DOCUMENTS

| 2,891,196 | A | * | 6/1959 | Lisser | ............ 219/130.51 |
| 3,376,470 | A | * | 4/1968 | Stone et al. | ............ 315/171 |
| 3,657,512 | A | | 4/1972 | Bodarenko | |
| 4,767,912 | A | * | 8/1988 | Eldridge | ............ 219/130.4 |
| 4,870,248 | A | | 9/1989 | Gilliland | |
| 5,117,088 | A | * | 5/1992 | Stava | ............ 219/130.4 |
| 5,406,052 | A | | 4/1995 | Mizuno et al. | |
| 5,965,038 | A | | 10/1999 | Nomura et al. | |

FOREIGN PATENT DOCUMENTS

| DE | 33 42 932 | 6/1985 |
| DE | 195 07 649 | 9/1995 |
| EP | 1 197 285 | 1/2002 |
| EP | 947 276 | 1/2002 |
| GB | 1 225 054 | 3/1971 |
| JP | 04 305374 | 3/1993 |

* cited by examiner

*Primary Examiner*—Mark H Paschall
(74) *Attorney, Agent, or Firm*—Collard & Roe, P.C.

(57) ABSTRACT

The invention relates to a method for the contactless ignition of a welding arc, in addition to a circuit (28) for the contactless ignition of an electric arc, comprising a charging circuit (31), at least one pulse capacitor (30), a decharging circuit containing a circuit, and a high tension converter (32) which is used to inject the high frequency ignition pulses discharged by the pulse capacitor (30) via the circuit to the welding electrode (27). In order to create said type of ignition method and an ignition circuit (28) which enables the welding arc to be ignited in an exact and/or safe and rapid manner and/or to create an improved ignition quality, the charge circuit (31) is connected to a pulse compression circuit (40) comprising the pulse capacitor (30), the high tension converter (32) and the circuit, the circuit being formed by a magnetic throttle valve (41), such that a high frequency circuit of the ignition pulse can be obtained.

9 Claims, 8 Drawing Sheets

METHOD AND CIRCUIT FOR CONTACTLESS IGNITION OF A WELDING ARC WITH HIGH FREQUENCY IGNITION PULSE PACKETS

CROSS REFERENCE TO RELATED APPLICATIONS

Applicants claim priority under 35 U.S.C. §119 of Austrian Application No. A 1889/2003 filed Nov. 25, 2003. Applicants also claim priority under 35 U.S.C. §365 of PCT/AT2004/000394 filed Nov. 10, 2004. The international application under PCT article 21(2) was not published in English.

The invention relates to a method for the contactless ignition of a welding arc, in which high-frequency ignition pulses are applied between the welding electrode and the workpiece to be worked to ionize the gap between the welding electrode and the workpiece, and in which the welding current is connected after the ignition of the welding arc, as well as a circuit for the contactless ignition of a welding arc, including a charge circuit, at least one pulse capacitor, at least one discharge circuit containing a switch, and a high-voltage transformer for coupling the high-frequency ignition pulses discharged from the pulse capacitor via the switch to the welding electrode.

The ignition method according to the invention as well as the ignition device, in principle, are suitable for the most diverse welding processes such as, e.g., WIG (tungsten inert gas) welding processes and plasma welding processes as well as for welding methods using consumable electrodes or non-consumable electrodes. Furthermore, the application of the ignition method and ignition device is suitable both for manually operated welding torches and for welding torches used in automated applications and, in particular, robotic applications.

In respect to the ignition of welding arcs, it is distinguished between contact ignition and contactless HF ignition. Contact ignition involves the placing of the welding electrode on the workpiece and, after this, the slight relifting of the welding electrode from the workpiece under the simultaneous connection of the welding current, followed by the ignition of the electric arc. This method is relatively simple and cost-effective, avoiding interferences with other electronic components of welding plants on account of the high frequency used for HF ignition. Yet, inclusions in, and contaminations on, the workpiece may occur due to the contact between the welding electrode and the workpiece, which, on the other hand, will cause the wear of the electrode.

By contrast, with contactless HF ignition, the welding electrode always remains in a spaced-apart relationship to the workpiece, and a high-frequency high voltage is applied between the welding electrode and the workpiece, which causes the gas molecules to be ionized in the space between the electrode and the workpiece such that the welding arc can be ignited without a contact taking place between the workpiece and the electrode. In order to be able to prevent any unintentional contact of the workpiece with the electrode, distances at which an ignition is feasible, of at least some millimeters up to some centimeters are sought between the electrode and the workpiece. After the ignition of the electric arc, the welding torch is further removed from the workpiece, or moved towards the workpiece, and supplied with the regular welding current, and the regular welding procedure may commence. The electronic switching elements used to generate high-voltage pulses in that case have to withstand important currents and voltages. For this reason, thyristors or semiconductor components and spark gaps are usually employed as switches.

EP 1 197 285 A2 discloses a switching arrangement for the generation of ignition pulses for welding arcs, which comprises a reverse converter circuit including four bridge-connected thyristors that are controlled by a trigger circuit. To provide an improved ignition pulse control, the control of the discharge circuit is effected at instances depending on the parameters of the welding process. The use of thyristors as switching elements involves the drawback that the maximum switching frequency is relatively low and these components, moreover, have to be accordingly largely dimensioned, which entails substantially increased costs. Due to the low switching frequency of thyristors, namely, for instance, about 100 Hz, a poorer ionization of the protective gas is achieved, so that a very rapid and safe ignition of the electric arc will not always be ensured.

EP 947 276 B1 discloses a method and a device for the ignition of a welding arc, by which the charging capacitor is discharged via a spark gap. As compared to thyristors, spark gaps offer the advantage of being very sturdy and withstand high voltages and currents. In addition, relatively high switching frequencies are attainable. The use of spark gaps, however, involves the disadvantages of large structural dimensions and additional constructional expenditures on account of the cooling that is required in most cases. Moreover, spark gaps are prone to high wear, and components may oxidize due to the production of ozone. Finally, electromagnetic interferences may cause problems, particularly with highly sensitive robot controls, which can only be prevented by suitable additional screening means.

U.S. Pat. No. 4,870,248 A discloses an electric arc welding apparatus exhibiting an enhanced ignitability. There, the voltage between the electrode and the workpiece is measured in order to be able to detect the ignition of an electric arc. If an electric arc has not been ignited, a higher-frequency ignition pulse will be applied to ensure an elevated ignition probability. As long as the electric arc has not been ignited, the voltage on the electrode will rise until the electric arc will finally be ignited. After the ignition of the electric arc, an oscillator provides the frequency and pulse width required for the welding procedure. The energy supplied to the electrode must, however, remain below prescribed limit values. A more precise ignition of the electric arc is not feasible with the circuit according to that document.

DE 33 42 932 A1 describes a method for the vibrationless ignition in MIG-MAG welding by applying between the welding wire and the workpiece a high-frequency voltage, whose ignition sequence is a function of the wire advance speed. Consequently, the wire advance speed need not be reduced during the ignition. Yet, this does not yield a more precise and safe ignition of the electric arc, either.

The object of the present invention resides in providing an above-defined ignition method as well as the respective ignition device, which enable a more precise or safe and very rapid ignition of the electric arc and ensure an elevated ignitability. The method and device are to involve as little expenditure as possible. Finally, the ignition method and ignition device are to be adaptable to the respective welding conditions. Furthermore, the ignition is to function in a manner as independently of the respective load as possible.

The object according to the invention in method terms is achieved in that several pulse packets with presettable frequencies or time periods are applied, wherein several successive ignition pulses are emitted in a pulse packet and a packet interval is each executed between said pulse packets. By applying the ignition pulses in several pulse packets between which accordingly long intervals are provided, the coupled energy of the ignition pulses can be selected to be accordingly high so as to ensure a rapid and reliable ignition while enabling the maximally permissible time-averaged energy supplied to be arranged below the prescribed limit values. As many ignition pulses as possible are actually arranged per pulse packet, which calls for as high an ignition pulse frequency as possible. The ionization of the gas present between the welding electrode and the workpiece to be worked is facilitated by an increased number of ignition pulses, and hence the ignition of the welding arc is more readily achieved. The ignition method according to the invention is characterized by a particularly high quality and a reliable and rapid ignition of the electric arc. Said ignition method enables an ignition with a larger distance provided between the welding electrode and the workpiece, or a substantially more precise ignition at usual distances, than have been feasible with conventional methods. Due to the low mean energy introduction, the safety risk will be minimized too, i.e., the operator of a welding torch will not be electrified at all or less strongly. Such a reduced electrification effect helps avoid accidents, for instance, at a fall of a welder from a scaffold or the like.

Since the ignition pulses emitted in a pulse packet are changeable in terms of number and/or frequency, the optimum adaptation of the ignition process to the most diverse conditions is feasible.

In an advantageous manner, the ratio of the repetition rate, or period duration, of a pulse packet to the duration of the ignition pulses is high.

According to a further characteristic feature of the invention, the ignition pulses within a pulse packet are applied to the welding electrode at a period duration of, for instance, between 25 µs and 1 ms, preferably 125 µs. Such a low period duration or high repetition frequency of the ignition pulses ensures that the ionization of the gas present between the welding electrode and the workpiece occurs more rapidly and strongly, thus promoting the ignition of the welding arc. Such a low period duration or high repetition frequency has not been possible with known ignition circuits using thyristors.

The period duration of the pulse packets, according to a further characteristic feature of the invention, is between 1 ms and 1 s, preferably 100 ms. By such a repetition frequency ranging between 1 Hz and 1000 Hz at an accordingly short pulse packets duration, it is ensured that the mean energy supplied can be adjusted and adapted with a view to enabling, for instance with manually operated welding torches, the predetermination of the energy amount and, hence, the adaptation to special regulations and standards. A reliable and rapid ignition of the electric arc will, thus, be ensured without quality losses even with a limited amount of energy on the output of the welding plant.

If the welding current is applied for a defined time period following the start of the ignition pulses or pulse packet emission, an even better ignition will be achieved, since a preionization of the air or gas flow will occur during that pregiven time period and an enhanced ignition will, thus, be enabled because of the appropriate charge carriers being already present between the welding electrode and the workpiece.

In an advantageous manner, the duration of the pulse packets and the number of ignition pulses per pulse packet, respectively, are adjusted as a function of the welding parameters such as, e.g., the material of the workpiece to be worked, the material of the welding electrode and/or the protective gas employed, etc. This enables the adaptation of the ignition process to the respective welding conditions. An adaptation may, for instance, be made when using protective gases that are difficult to ionize, such as e.g. helium, so as to ensure a reliable and very rapid ignition even in those cases.

In terms of circuitry, the object according to the invention is achieved in that a pulse compression circuit connected with the charge circuit is provided, comprising the pulse capacitor, the high-voltage transformer and the switch, said switch being formed by a magnetic inductor so as to ensure the high-frequency switching of the ignition pulses. Unlike thyristors or spark gaps, the use of a magnetic inductor enables the switching of ignition pulses at high frequencies ranging, for instance, from 1 to 40 KHz. By the extremely high ignition frequencies, a precise and safe ignition will be reached, since a more intense ionization of the air or gas flow between the welding electrode and the workpiece is obtained. Finally, the ignition circuit according to the invention provides a load-independent ignition and, hence, for instance, an effective ignition even with very long hose packs, which constitute high loads lowering the ignition voltage accordingly, since higher voltages can be adjusted by the emission of pulse packets, while keeping the energy mean value resulting from the pulse packets accordingly low. With thyristors, no or only a particularly poor ignition would be feasible with an accordingly low voltage due to long hose packs or the like, or they would have to be accordingly largely dimensioned.

The pulse compression circuit may also be comprised of two or several consecutively arranged stages, each stage containing at least one pulse capacitor, a switch formed by a magnetic inductor and a high-voltage transformer. While the requirements of the charge circuit can be reduced with multi-stage pulse compression circuits, they involve elevated circuitry expenditures and, hence, an elevated space demand.

If a device for controlling the ignition pulses is connected with the charge circuit, a suitable control of the ignition pulses and, hence, an adaptation of the ignition to the respective welding parameters will be feasible.

If the control device is also connected with a welding current source to control the instant at which the welding current is connected upon completion of the ignition, a delay in the connection of the welding current relative to the ignition pulse packets may, for instance, be effected to cause the preionization of the air or gas flow provided between the welding torch and the workpiece and, hence, ensure an even more precise and easier ignition. The coupling of ignition pulses into the welding torch can be effected in a capacitive manner via a series-connected coupling capacitor or in an inductive manner via a coupling coil.

Figure 1:
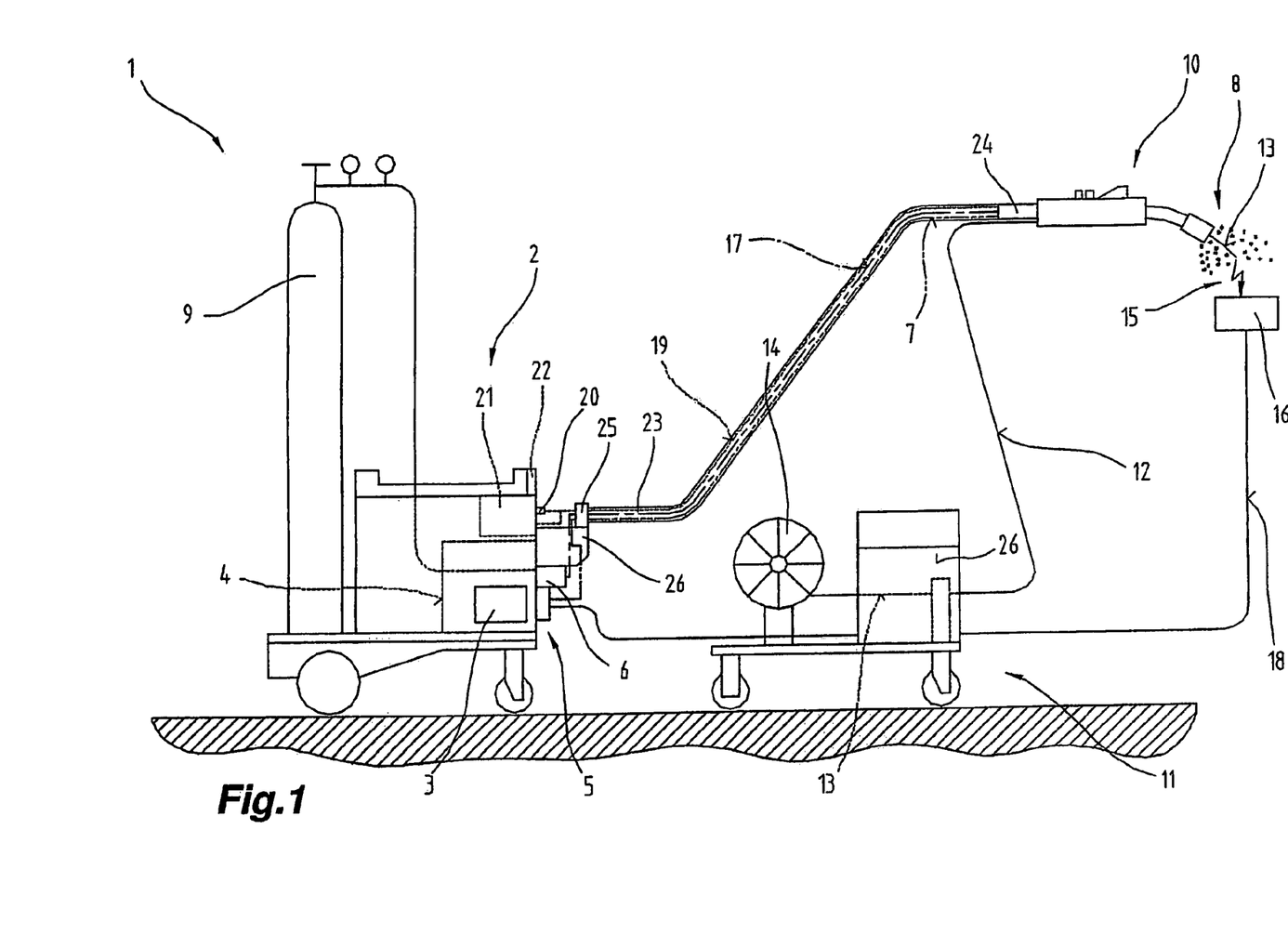
FIG. 1 is a diagrammatic view of a welding plant or welding installation.

The present invention will be explained in more detail by way of the attached drawings. Therein:

FIG. 1 depicts a welding apparatus 1, or welding installation, for various processes or methods such as, e.g., MIG/MAG welding or WIG/TIG welding, or electrode welding methods, double-wire/tandem welding methods, plasma or soldering methods etc.

The welding apparatus 1 comprises a power source 2 including a power element 3, a control device 4, and a switch member 5 associated with the power element 3 and control device 4, respectively. The switch member 5 and the control device 4 are connected to a control valve 6 arranged in a feed line 7 for a gas 8 and, in particular, a protective gas such as, for instance, carbon dioxide, helium or argon and the like, between a gas reservoir 9 and a welding torch 10 or torch.

In addition, a wire feeder 11 usually employed in MIG/MAG welding can be controlled by the control device 4, whereby an additional material or welding wire 13 is fed from a feed drum 14 or wire coil into the region of the welding torch 10 via a feed line 12. It is, of course, possible to integrate the wire feeder 11 in the welding apparatus 1 and, in particular, its basic housing, as is known from the prior art, rather than designing the same as an accessory device as illustrated in FIG. 1.

It is also feasible for the wire feeder 11 to supply the welding wire 13, or additional material, to the process site outside of the welding torch 10, to which end a non-consumable electrode is preferably arranged within the welding torch 10, as is usually the case with WIG/TIG welding.

The power required to build up an electric arc 15, in particular an operational electric arc, between the electrode and a workpiece 16 is supplied from the power element 3 of the power source 2 to the welding torch 10, in particular electrode, via a welding line 17, wherein the workpiece 16 to be welded, which is formed of several parts, is likewise connected with the welding apparatus 1 and, in particular, power source 2 via a further welding line 18, thus enabling a power circuit for a process to build up over the electric arc 15, or plasma jet formed.

To provide cooling of the welding torch 10, the welding torch 10 can be connected to a fluid reservoir, in particular a water reservoir 21, by a cooling circuit 19 via an interposed flow control 20, whereby the cooling circuit 19 and, in particular, a fluid pump used for a fluid contained in the water reservoir 21, is started as the welding torch 10 is put into operation so as to effect cooling of the welding torch 10.

The welding apparatus 1 further comprises an input and/or output device 22, via which the most different welding parameters, operating modes or welding programs of the welding apparatus 1 can be set and called, respectively. In doing so, the welding parameters, operating modes or welding programs set via the input and/or output device 22 are transmitted to the control device 4, which subsequently controls the individual components of the welding installation or welding apparatus 1 and/or predetermines the respective set values for controlling.

In the exemplary embodiment illustrated, the welding torch 10 is, furthermore, connected with the welding apparatus 1 or welding installation via a hose package 23. The hose package 23 accommodates the individual lines from the welding apparatus 1 to the welding torch 10. The hose package 23 is connected with the welding torch 10 via a coupling device 24, whereas the individual lines arranged in the hose package 23 are connected with the individual connections of the welding apparatus 1 via connection sockets or plug-in connections. In order to ensure an appropriate strain relief of the hose package 23, the hose package 23 is connected with a housing 26, in particular the basic housing of the welding apparatus 1, via a strain relief means 25. It is, of course, also possible to use the coupling device 24 for connection to the welding apparatus 1.

It should basically be noted that not all of the previously mentioned components will have to be used or employed for the various welding methods or welding apparatus 1 such as, e.g., WIG devices or MIG/MAG apparatus or plasma devices. Thus, it is, for instance, feasible to devise the welding torch 10 as an air-cooled welding torch 10.

Figure 2:
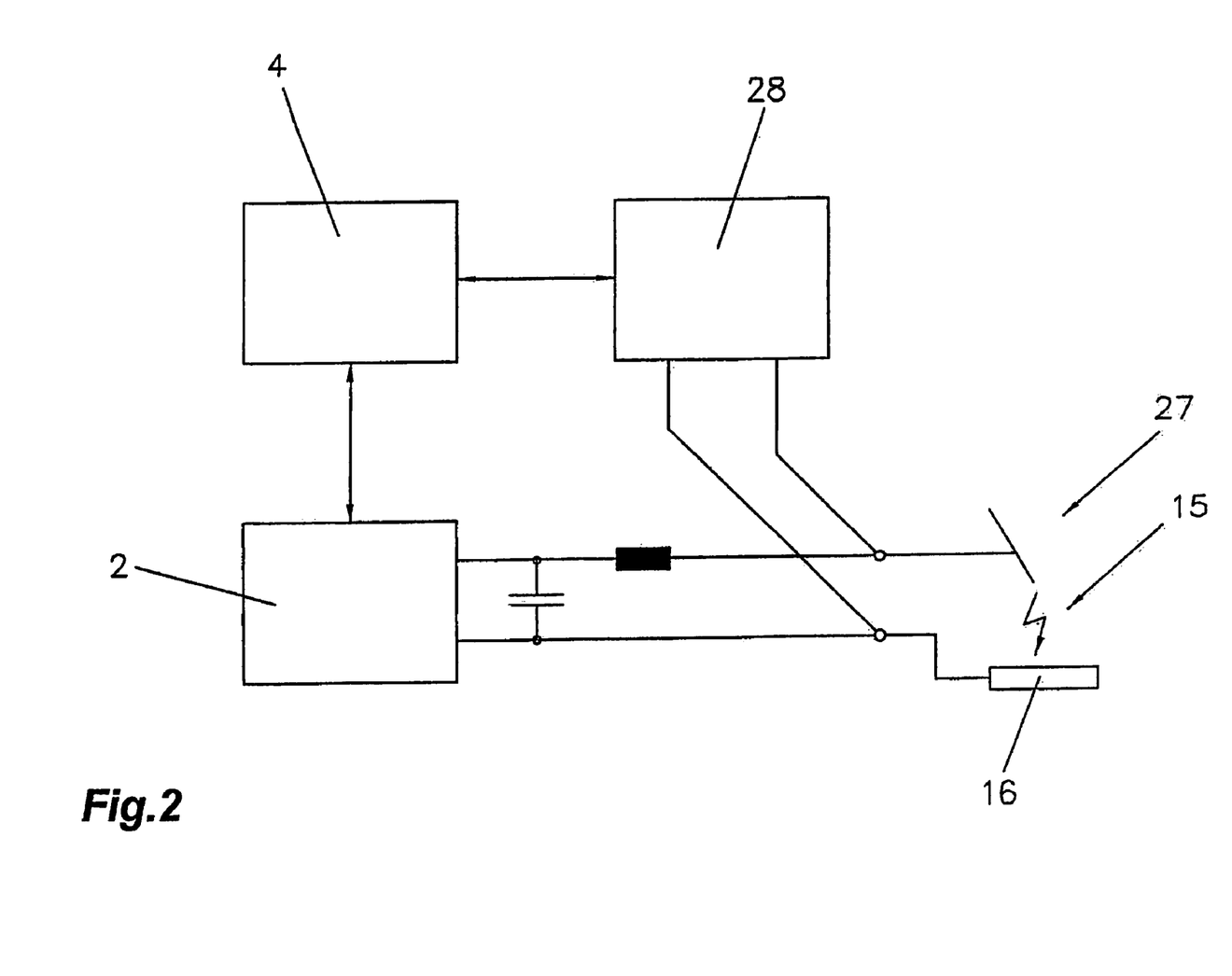
FIG. 2 is a block diagram of the welding installation including a device for the contactless ignition of a welding arc.

FIG. 2 is a basic block diagram of a circuit for the contactless ignition of a welding arc, including a welding current source or power source 2 which supplies the welding torch 10 opposite the workpiece 16 during the welding process with the appropriate power and appropriate voltage. For the contactless ignition of the welding arc 15 between a welding electrode 27, which is a non-consumable electrode in the example illustrated, and the workpiece 16 to be worked, an ignition circuit 28 is arranged in parallel with the welding electrode 27 and the workpiece 16 to apply high-frequency ignition pulses at accordingly high voltages between the welding electrode 27 and the workpiece 16 such that the air or gas 8 provided between the welding torch 10 and the workpiece 16 is ionized in order to promote the formation of the electric arc 15. The control device 4, which may also be connected with the welding current source, serves to control the ignition circuit 28. To this end, the control device 4, for instance, has to activate the ignition circuit at the actuation of a starter switch provided on the welding torch 10 and to deactivate the same again at the ignition of the electric arc 15 in order to prevent the high-voltage pulses from being emitted during the welding process. It would, of course, also be feasible to emit the high-voltage pulses over the entire welding process, yet this would involve the risk of interferences with neighboring devices. As a rule, the high-voltage pulses are, thus, broken off after the ignition of the electric arc, or briefly reactivated under respectively required conditions, which means that the HF ignition, i.e. the ignition circuit 28, is, for instance, activated during A.C. welding synchronously with the zero crossing in order to ensure an enhanced and, above all, reliable reignition of the electric arc 15.

Figure 3:
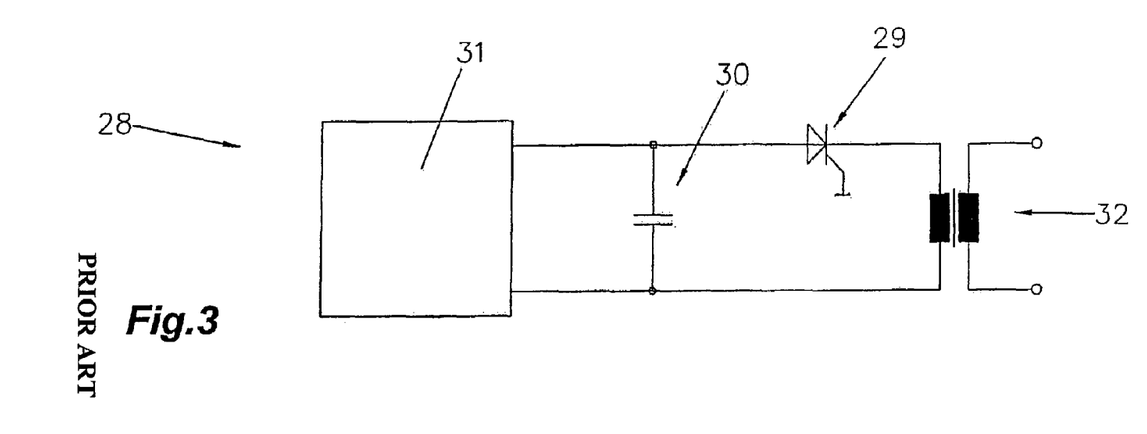
FIG. 3 is a basic circuit diagram of an ignition circuit according to the prior art including a thyristor.
Figure 4:
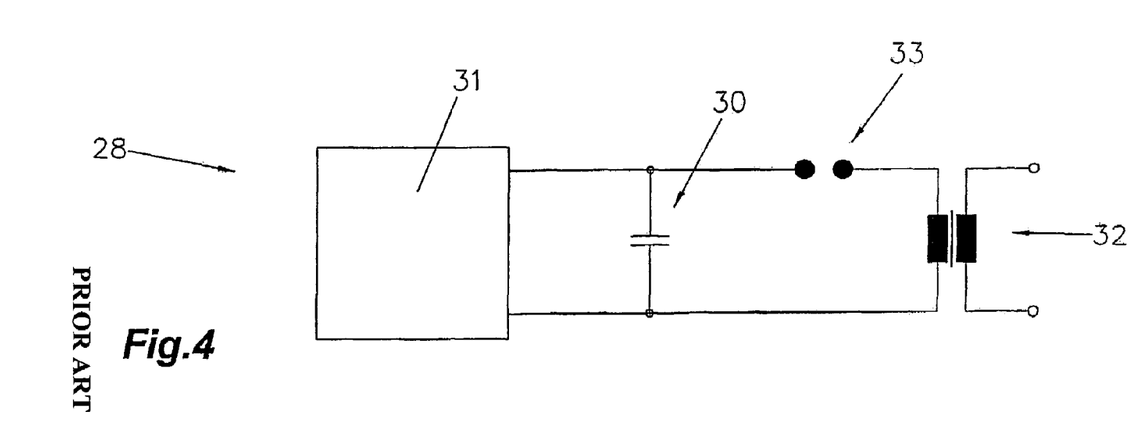
FIG. 4 is a basic circuit diagram of an ignition circuit according to the prior art including a spark gap.

FIGS. 3 and 4 are basic circuit diagrams of ignition circuits as they have existed in the prior art. In this context, FIG. 3 depicts an ignition circuit 28 in which a thyristor 29 is used as a switch to transmit the charge of a pulse capacitor 30, which is generated by a charge circuit 31, via a high-voltage transformer 32 to the welding electrode 27 and the workpiece 16 (not illustrated). In doing so, it is feasible to employ any charge circuit known from the prior art. The discharge circuit may also be comprised of four bridge-connected thyristors 29 as is, for instance, described in EP 1 197 285 A2. Thyristors 29 which are used as switches involve the disadvantage of providing but relatively low switching frequencies.

In the variant according to the prior art as in correspondence with FIG. 4, a spark gap 33 is used as a switch, which enables the attainment of higher switching frequencies, yet involves elevated constructional expenditures. A substantial disadvantage of spark gaps 33 consists in that they produce ozone, for which reason destructions of electronic components and/or printed circuit boards and/or synthetic materials etc. may occur on account of the elevated ozone impact, if spark gaps 33 are integrated in welding apparatus 1. At the same time, elevated electromagnetic disturbances are caused by the spark gaps 33, the avoidance of which calls for extensive screening expenditures.

Figure 5:
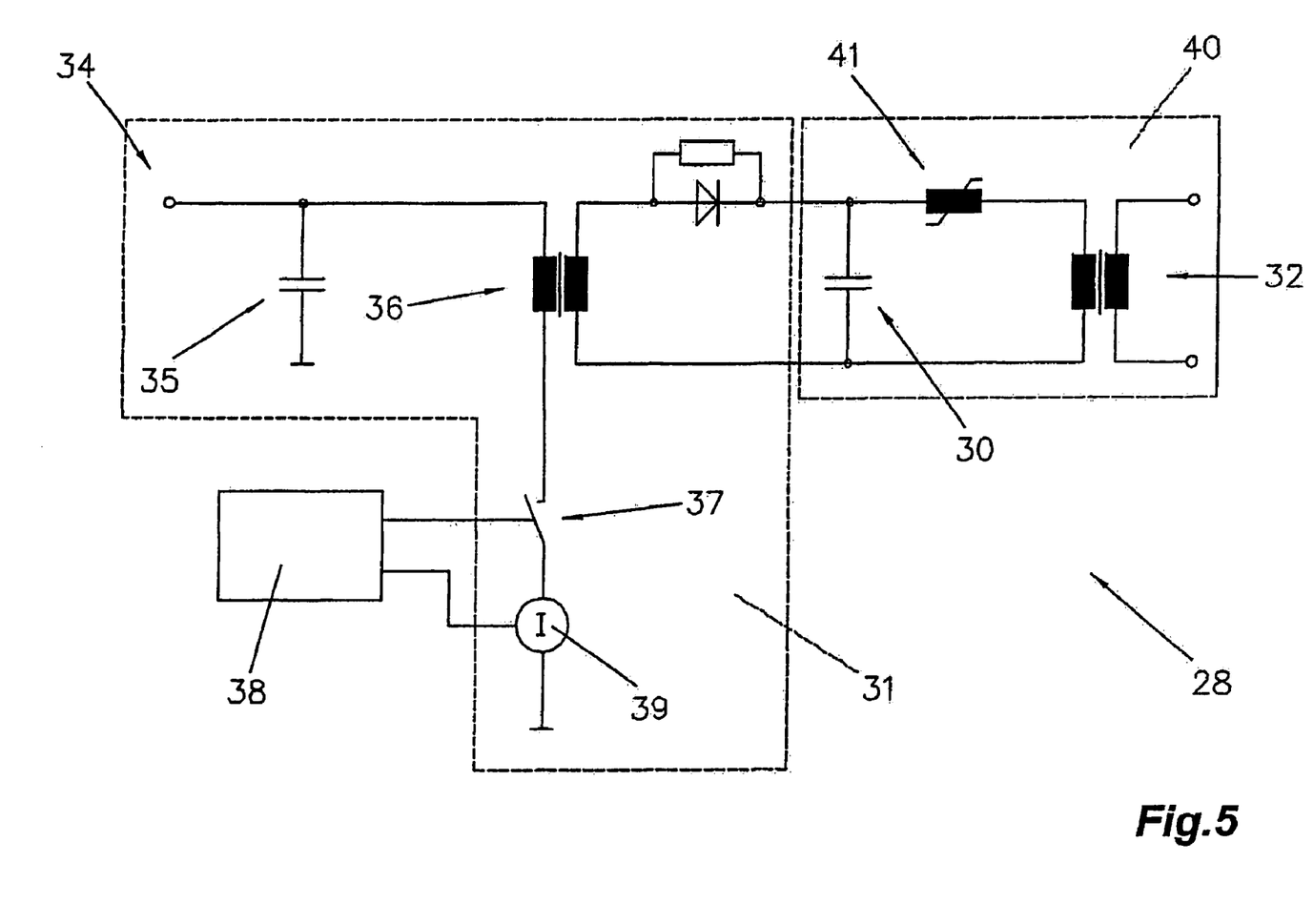
FIG. 5 is a detailed view of an embodiment of the ignition circuit according to the present invention.

FIG. 5 illustrates a basic variant embodiment of the ignition circuit 28 according to the present application, wherein the charge circuit 31 comprises a connection 34 for connecting the supply voltage, and a buffer capacitor 35 connected to ground. The buffer capacitor 35 and the connection 34 are connected to ground via a transformer 36 and a switching element 37. The pulse capacitor 30 is charged via the transformer 36 by the aid of the supply voltage applied to the connection 34.

A current probe 39 may be additionally provided to detect the charging current and transmit to the control 38 a signal that is proportional thereto. For the charge circuit 31, a structure known from the prior art has been illustrated, yet any charge circuit 31 known from the prior art can be employed. It is, moreover, feasible to effect a direct control from the control device 4 of the welding apparatus 1 instead of using the additional control 38.

Connected with the charge circuit 31 is a pulse compression circuit 40 according to the invention, which comprises a magnetic inductor 41 as a switch, the pulse capacitor 30 and the high-voltage transformer 32. Via the magnetic inductor 41, the charge of the pulse capacitor 30 is transferred or connected to the high-voltage transformer 32 and, from there, to the terminals of the welding electrode 27 and workpiece 16 (not illustrated), respectively. The control of the charge of the pulse capacitor 30 is effected via the electronic switch 37, which is controlled by a suitable control 38 or 4 in a manner that, with the switch 37 activated, a current flow takes place via the primary side of the transformer 36, thus causing an energy transmission at the transformer 36 to reset the magnetic switch or inductor 41. During the deactivation of the switch 37, the magnetically stored energy is then transformed via the transformer 36, which causes the pulse capacitor 30 to be charged. If a particular voltage-time area is reached during the charging of the pulse capacitor 30, the magnetic inductor 40 will automatically connect through so as to cause the energy charged in the pulse capacitor 30 to be discharged via the high-voltage transformer 32 and a current or voltage pulse to be generated. The configuration according to the invention, of the switch as a magnetic inductor 41 enables extremely high switching frequencies to be attained so as to ensure the rapid and reliable ignition of the electric arc 15. Moreover, the inductor 41 is very robust in respect to the high voltages and currents occurring at the ignition of the welding arc 15. Unlike with spark gaps 33, which, as a rule, have to be cooled, the structural expenditures with the inductor 41 according to the invention are relatively low, and the generation of interfering signals is considerably reduced, too.

FIGS. 6 to 10 represent different time behaviors of a generated HF output signal 42 and a control voltage 43. The HF output signal 42 in this case is schematically illustrated in the form of rectangular pulses and, in particular, the generated current and/or voltage pulses. As a rule, rectangular pulses are formed by current and/or voltage pulses showing decaying behaviors. The HF output signal 42 is basically formed in a manner that one or several pulse packets 44 with presettable frequencies or time periods are applied to the welding electrode 27, and several successive ignition pulses 45 are emitted in a pulse packet 44, with a packet interval 46 being each executed between the pulse packets 44. In doing so, the ratio of the repetition rate or period duration 47 of the pulse packets 44 to the duration of period duration 50 of the ignition pulses 45 is high. The packet period duration 47 comprised of a pulse packet 44 and a successive packet interval is, for instance, 1 ms to 1 s according to a repetition frequency of the pulse packets 44 of 1 to 1000 Hz. The duration 48 of the pulse packet 44 preferably corresponds to 50 μs to 300 ms, being freely presettable. The period durations 50 of the ignition pulses 45 are, for instance, 25 μs to 1 ms as in correspondence with a repetition frequency of 1 kHz to 40 kHz.

By emitting individual pulse packets 44, different HF output signals 42 showing different time behaviors and frequencies can be formed. Thus, the optimum adaptation of the HF output signal 42 to the respective welding conditions is feasible, which means that appropriate HF output signals 42 are generated by the welding apparatus 1 or control device 4 and/or 38 as a function of the adjusted parameters so as to ensure a very rapid and reliable ignition of the electric arc 15.

Figure 6:
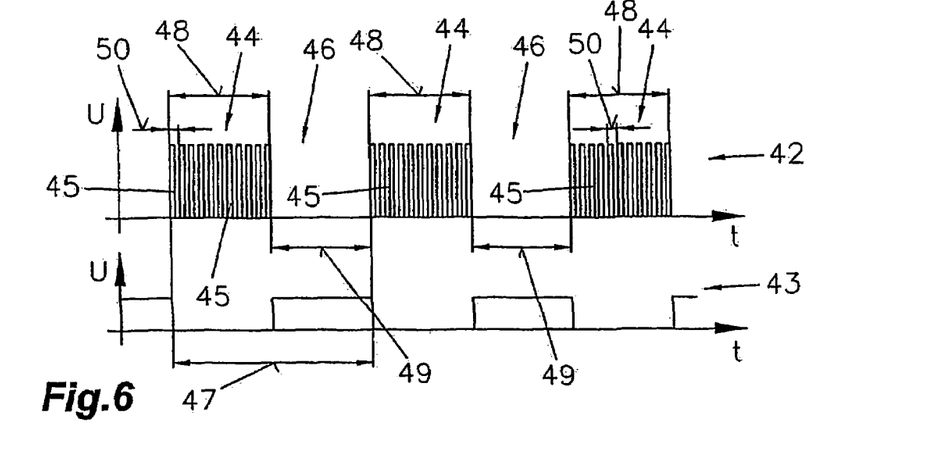
FIGS. 6 to 10 illustrate different time behaviors of the generated ignition voltage and control voltage in simplified, schematic form.

In FIG. 6, the HF output signal 42 is, for instance, designed in a manner that a packet period duration 47, which is comprised of a pulse packet 44 and a packet interval 46, is formed by an equal pulse duty factor, i.e., a period 48 for a pulse packet 44 is as large as a period 49 for a packet interval 46. It is, thus, feasible for a pulse packet 44 to contain a plurality of ignition pulses 45 as a function of the respective dimension, that is, as a function of the length of a period 48. A pulse packet 44 may, for instance, contain between 1 and 300, preferably 60, ignition pulses 45. The number of possible ignition pulses 45 in this case is a function of the selected ignition period duration 60 or its frequency.

The essential advantage of the packet-like formation of the HF output signal 42 resides in that the thus emitted energy can be reduced while, nevertheless, safeguarding the reliable ignition of the electric arc 15, which means that less energy is on an average transmitted to the welding electrode 27 by applying pulse packets 44 to the same, wherein, however, a very large amount of energy is available for the ignition of the electric arc 15 during a pulse packet 44. It is, thus, feasible to adjust or predetermine the mean energy by appropriately controlling the HF output signal 42, so that the present ignition method will also be applicable with manually operated welding torches, or even with automated applications in which the maximum output or energy amount is limited.

Figure 7:
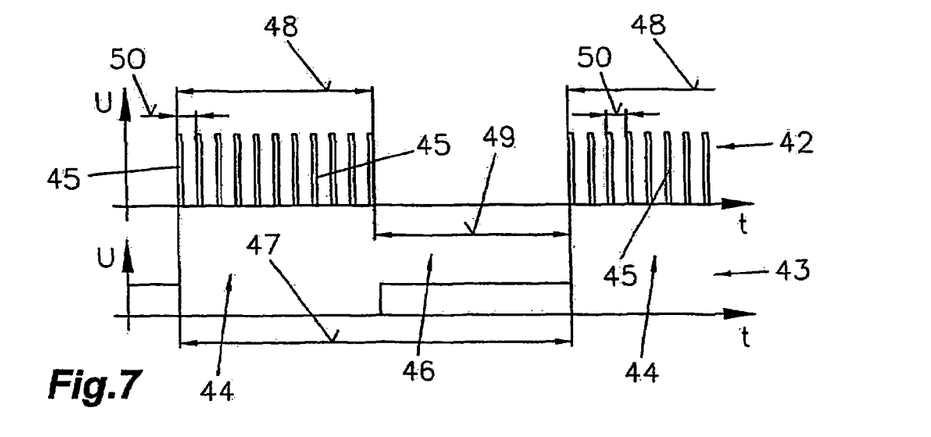

FIG. 7 depicts a further example of a HF output signal 42. As in contrast to the exemplary embodiment of FIG. 6, the packet period duration 47 has now, for instance, been doubled, with the pulse duty factor between the time periods 48 and 49 for the pulse packets 44 and the packet intervals 46, respectively, being again 50%.

In this exemplary embodiment, controlling is effected via the number of ignition pulses 45 in a pulse packet 44, which means that the same or pregiven number of ignition pulses 45 is repeatedly formed in a pulse packet 44, yet while changing the frequencies of the ignition pulses 45. To visualize this, the same number of ignition pulses 45 as contained in a pulse packet 44 according to FIG. 6 has been used in the exemplary embodiment illustrated in FIG. 7. At a comparison with FIG. 6, it is now apparent that the same number of ignition pulses 45 is again contained in a pulse packet 44, yet the ignition period duration 50 has been adapted accordingly on account of the extended period 48 for the pulse packet 44.

Figure 8:
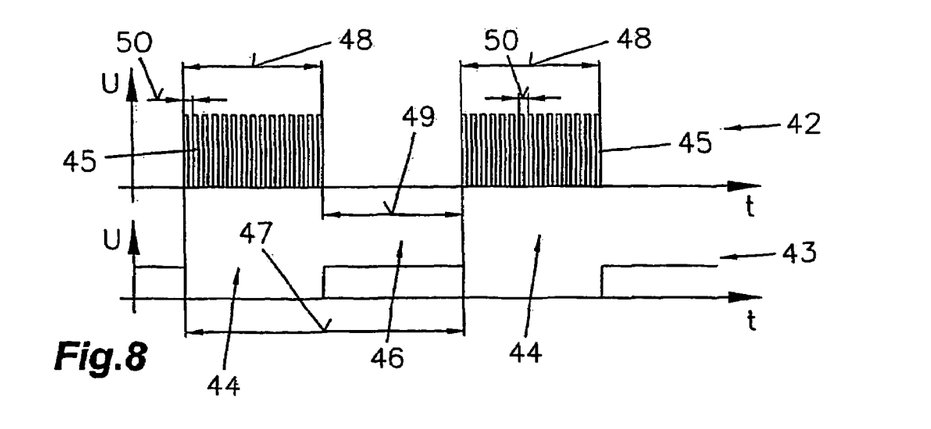

As is schematically illustrated in FIG. 8, it is, furthermore, possible to keep the frequency or ignition period duration 50 constant, whereby any desired number of ignition pulses 45 is formed in a pulse packet 44, which means that, on account of the time period 48 for the pulse packet 44, the ignition pulses 45 are emitted at a constant frequency over said period 48. For comparative purposes, the frequency or ignition period duration 50 of FIG. 6 has been used in FIG. 8, so that it is now clearly apparent that, due to the extended time period 48 for the pulse packet 44, substantially more ignition pulses 45 are formed within the pulse packet 44.

Figure 9:
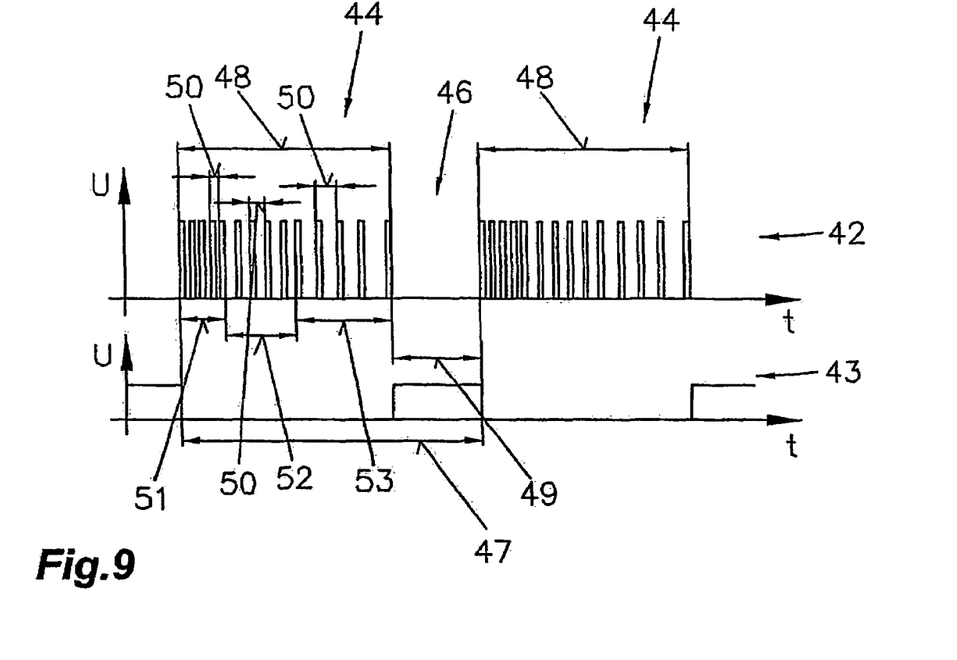

In the exemplary embodiment according to FIG. 9, the HF output signal 42 is formed in a manner that the frequency or ignition period duration 50 is modified within the pulse packet 44. Over defined time ranges 51 to 53 a modified frequency or ignition period duration 50 is, for instance, each executed in said time ranges 51 to 53, as is schematically illustrated. It is further apparent from this exemplary embodiment that the pulse duty factor between the pulse packets 44 and the pulse intervals 46 in a packet period duration 47 has been changed such that the time period 48 for a pulse packet 44 has now become longer than the time period 49 for the pulse interval 46. It is, of course, possible to make the time period 48 for the pulse packet 44 shorter than the time period 49 for the packet interval 46.

Figure 10:
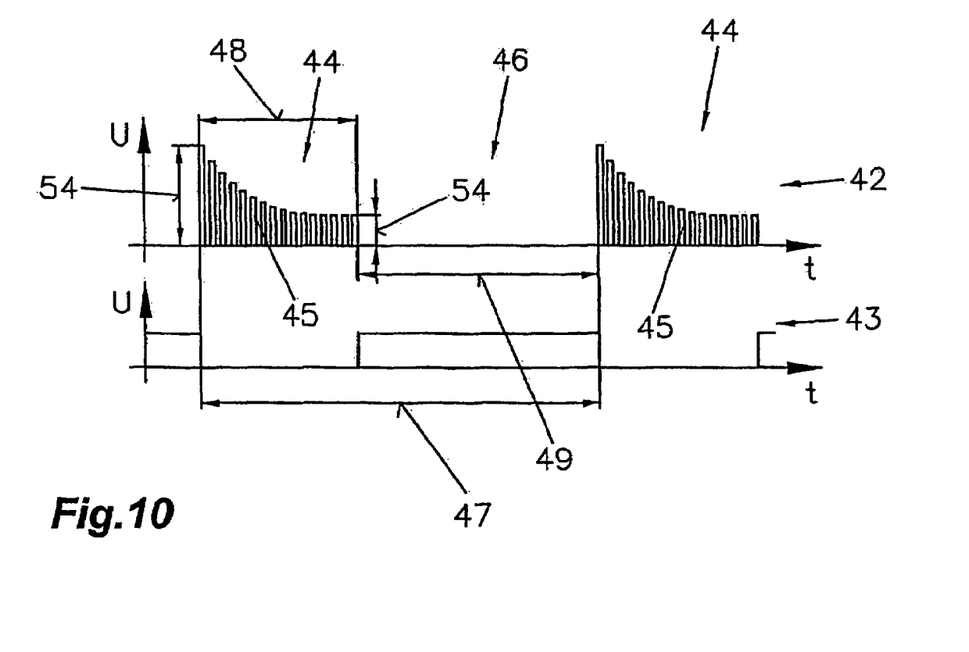

It is, furthermore, possible to change the voltage height 54 of the ignition pulse 45 for each pulse packet 44, or within a pulse packet 44, as illustrated in FIG. 10. In this exemplary embodiment, a reduction of the voltage height 54 takes place within a pulse packet 44.

It should basically be mentioned that it is feasible to only switch the welding current on after a defined time period after the application of the first ignition pulse 45 or pulse packet 44, thus causing a certain preionization of the air or gas 8 to occur between the welding electrode 27 and the workpiece 16 so as to ensure the rapid and reliable ignition of the welding arc 15. It is also feasible to preferably adapt to the welding conditions the pulse packet duration, i.e. the time period 48 or number of ignition pulses 45 within a pulse packet 44, as well as the packet period duration 47 of the pulse packets 44, which means that, for instance, the HF output signal 42 and, in particular, the type and form of the HF output signal 42 are generated on the basis of the adjusted parameters such as the material of the workpiece 16, the material of the welding electrode 27 or the employed protective gas or the like. The optimum ignition method can, thus, be applied to any welding process.

The coupling of the HF ignition and, in particular, HF output signal 42 into the welding cycle can be realized in any manner known from the prior art. In doing so, the high-voltage pulses are, for instance, capacitively coupled in via a coupling capacitor. It is, of course, also possible to realize the coupling in of the high-frequency ignition pulses inductively.

Figure 11:
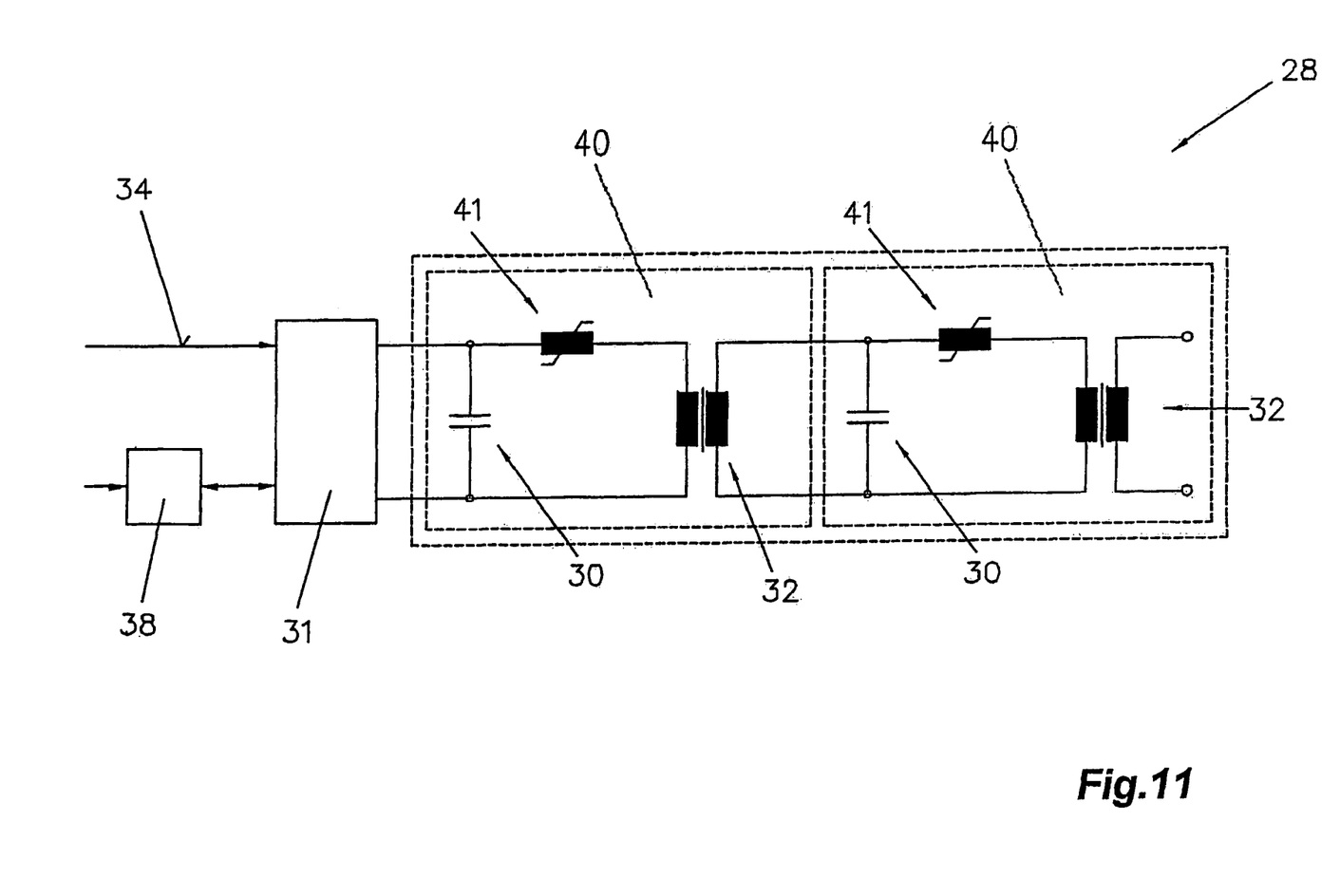
FIG. 11 illustrates an embodiment of the ignition circuit according to the invention including a two-stage pulse compression circuit.

FIG. 11 depicts a variant of the ignition circuit according to the invention, in which the pulse compression circuit 40 is comprised of two stages, each stage including a pulse capacitor 30, a magnetic inductor 41 and a high-voltage transformer 32. Multi-stage pulse compression circuits 40 offer the advantage that the demands on the charge circuit 31 are not too high, yet structural expenditures will be increased.

Figure 12:
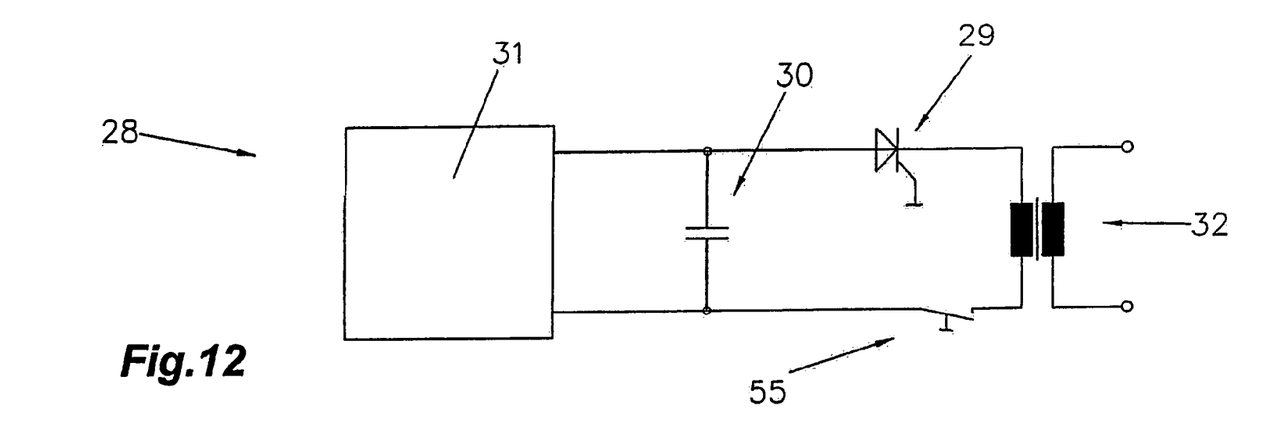
FIG. 12 illustrates an embodiment for the application of the method according to the invention in an ignition circuit known from the prior art and including a thyristor.
Figure 13:
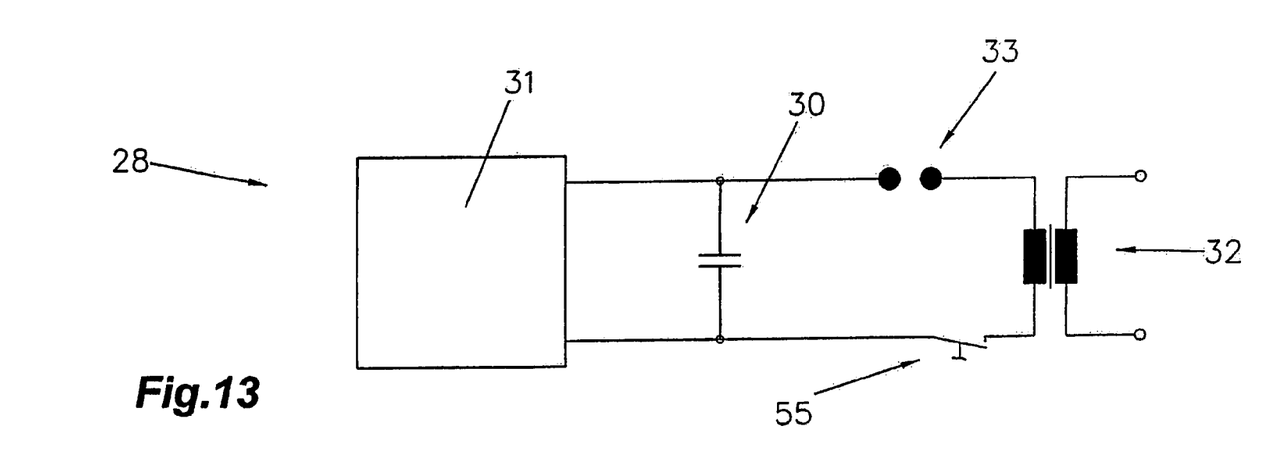
FIG. 13 illustrates a further embodiment for the application of the method according to the invention in an ignition circuit known from the prior art and including a spark gap.

In the further exemplary embodiments according to FIGS. 12 and 13, the application of the method for emitting pulse packets 44 to systems known from the prior art including, for instance, a thyristor 29 or a spark gap 33 is illustrated. For the sake of simplicity, a switching element 55 is integrated to this end to interrupt the primary circuit of the high-voltage transformer 32 for the generation of appropriate output signals. It is thereby possible to generate a pulse packet 44 over a defined time period 48 by an appropriate control of the switching element 55 such that the respective HF output signal 42 as described in FIGS. 6 to 10 will be generated. This may, of course, be realized by the appropriate control of a thyristor 29 or a controlled spark gap 33. When applying the method according to the invention, it is, furthermore, feasible to control the charge circuit 31 accordingly so as to form at the output or on the electrode 27 pulse packets 44 with intermediately formed pulse intervals 46 by the high-frequency ignition pulses 45 contained therein.

It is essential that the generated HF output signal 42 is formed by individual pulse packets 44 with intermediately arranged packet intervals 46. Consequently, the mean energy or output can be adjusted via the pulse duty factor so as to enable the adaptation of the output or mean energy to national regulations and standards.

The invention claimed is:

1. A method for the contactless ignition of a welding arc, in which high-frequency ignition pulses are applied between the welding electrode and the workpiece to be worked to ionize the gap between the welding electrode and the workpiece, and in which the welding current is connected after the ignition of the welding arc, wherein several pulse packets (44) with presettable frequencies and packet period durations (47), or time periods, are applied, wherein several successive ignition pulses (45) are emitted in a pulse packet (44) and a packet interval (46) is each executed between said pulse packets (44), so that overall energy expenditure during ignition can be minimized even while having a maximum energy in each ignition pulse, and wherein the welding current is connected only after a defined period after application of a first ignition pulse, so that preionization of the gap occurs between the welding electrode and the workpiece.

2. An ignition method according to claim 1, wherein the ignition pulses (45) emitted in a pulse packet (44) are changed in respect to at least one of their number, frequency and ignition period duration (50).

3. An ignition method according to claim 1 wherein the packet period duration (47) is greater than the duration of the ignition pulses.

4. An ignition method according to claim 1, wherein the ignition pulses (45) within a pulse packet (44) are applied at an ignition period duration (50) of between 25 µs and 1 ms.

5. An ignition method according to claim 1, wherein the pulse packets (44) are applied at a packet period duration (47) of between 1 ms and 1 s.

6. An ignition method according to claim 1, wherein the welding current is applied for a defined time period following the first ignition pulse (45).

7. An ignition method according to claim 1, wherein the time period (48) of the pulse packets (44) and the number of ignition pulses (45) per pulse packet (44), respectively, are adjusted or generated as a function of the adjusted welding parameters.

8. An ignition method according to claim 4, wherein the ignition pulses (45) within a pulse packet (44) are applied at an ignition period duration (50) of 125 µs.

9. An ignition method according to claim 5, wherein the pulse packets (44) are applied at a packet period duration (47) of 100 ms.

* * * * *

UNITED STATES PATENT AND TRADEMARK OFFICE
CERTIFICATE OF CORRECTION

PATENT NO.       : 7,638,734 B2
APPLICATION NO.  : 10/578970
DATED            : December 29, 2009
INVENTOR(S)      : Prinz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 266 days.

Signed and Sealed this

Ninth Day of November, 2010

David J. Kappos
*Director of the United States Patent and Trademark Office*